United States Patent [19]
Brotherson

[11] Patent Number: 5,963,009
[45] Date of Patent: Oct. 5, 1999

[54] SALT WATER POWER SOURCE AND LANTERN

[76] Inventor: Gaylen M. Brotherson, 9419 E. SanSalvador Dr., Scottsdale, Ariz. 85258

[21] Appl. No.: 09/049,397

[22] Filed: Mar. 27, 1998

[51] Int. Cl.[6] .............................. H02J 7/00; H01M 6/34; F21L 7/00
[52] U.S. Cl. .......................... 320/101; 429/119; 362/194
[58] Field of Search ............................ 320/107; 429/119, 429/118, 218.1, 188, 224; 362/109, 157, 194, 171

[56] References Cited

U.S. PATENT DOCUMENTS

| | | | |
|---|---|---|---|
| 3,326,724 | 6/1967 | Armitage | 429/119 |
| 4,184,008 | 1/1980 | Watakabe | 429/27 |
| 4,628,420 | 12/1986 | MacArthur | 362/208 |
| 4,745,529 | 5/1988 | Hamlen et al. | 362/157 |
| 5,024,904 | 6/1991 | Curiel | 429/27 |

*Primary Examiner*—Peter S. Wong
*Assistant Examiner*—Gregory J. Toatley, Jr.
*Attorney, Agent, or Firm*—Zarley, McKee, Thomte Voorhees & Sease; Dennis L. Thomte

[57] ABSTRACT

A lantern and power source includes a hollow housing with a hollow tubular power cell formed within the housing. The tubular power cell includes an anode rod formed of a magnesium alloy and extending along the longitudinal axis of the hollow tube. An opening formed in the side wall of the hollow tube is covered by a metal cathode plate, and the tube is filled with salt water. An electrical lamp is mounted on the housing and has one terminal connected to the anode and one terminal connected to the cathode such that a flow of electrons caused by the caustic reaction of salt water with the magnesium alloy anode will light the lamp.

17 Claims, 4 Drawing Sheets

SALT WATER POWER SOURCE AND LANTERN

TECHNICAL FIELD

The present invention relates generally to apparatus for producing electrical energy, and more particularly to a salt water power source and a lantern powered by salt water.

BACKGROUND OF THE INVENTION

Conventionally, flashlights, radios, and other portable electrical powered equipment either required the use of batteries, or generators powered by gasoline, white gas, ethenol, propane or natural gas. The problems associated with petroleum based products are well documented, and will not be discucessed in detail herein. However, the toxic gases produced during combustion are only one of a variety of problems with use of such energy sources.

Electrical batteries are simple to use and transport, but have very limited lives in most portable electrical devices such as flashlights and portable radios. Thus, a good supply of batteries are needed if the electrical devices are to be used for any period of time. In addition, the used or drained battery must be disposed properly to avoid contamination of the environment.

SUMMARY OF THE INVENTION

It is therefore a general object of the present invention to provide an apparatus for producing electrical power from a non-petroleum product.

Still another object is to provide an apparatus for producing electrical energy which is powered by salt water.

A further object of the present invention is to provide a salt water powered electrical source which provides electricity for a greater length of time than conventional batteries, and without the harmful by-products of either combustion or batteries.

These and other objects of the present invention will be apparent to those skilled in the art.

The lantern and power source of the present invention includes a hollow housing with a hollow tubular power cell formed within the housing. The tubular power cell includes an anode rod formed of a magnesium alloy and extending along the longitudinal axis of the hollow tube. An opening formed in the side wall of the hollow tube is covered by a metal cathode plate, and the tube is filled with salt water. An electrical lamp is mounted on the housing and has one terminal connected to the anode and one terminal connected to the cathode such that a flow of electrons caused by the caustic reaction of salt water with the magnesium alloy anode will light the lamp.

DESCRIPTION OF THE PREFERRED EMBODIMENT

Figure 1:
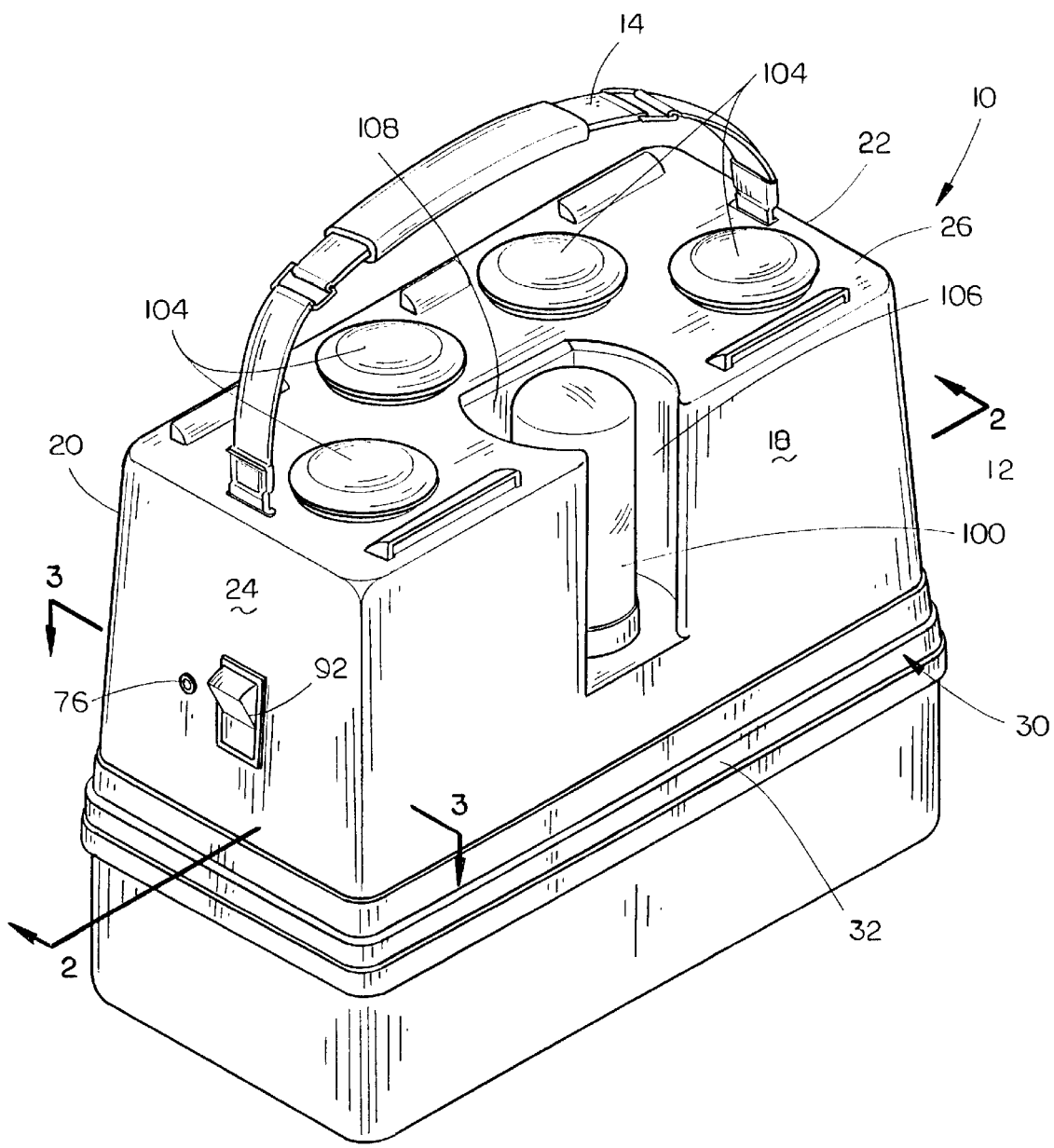
FIG. 1 is a perspective view of the salt water power source and lantern of the present invention.

Referring now to the drawings, in which similar or corresponding parts are identified with the same reference numeral, and more particularly to FIG. 1, the salt water power source and lantern of the present invention is designated generally at 10 and includes a housing 12 having a carrying strap 14 removably and adjustably connected thereto, to permit transport of the power source in lantern 10. Because the apparatus is configured as a lantern in the drawings, the apparatus will be described as a lantern throughout, although it can be used as a power source to power radios and other apparatus as well. The "lantern" description is merely intended for ease of description.

Housing 12 has a hollow interior cavity 16 enclosed by a front wall 18, rear wall 20, end walls 22 and 24, and top and bottom walls 26 and 28 respectively.

Figure 2:
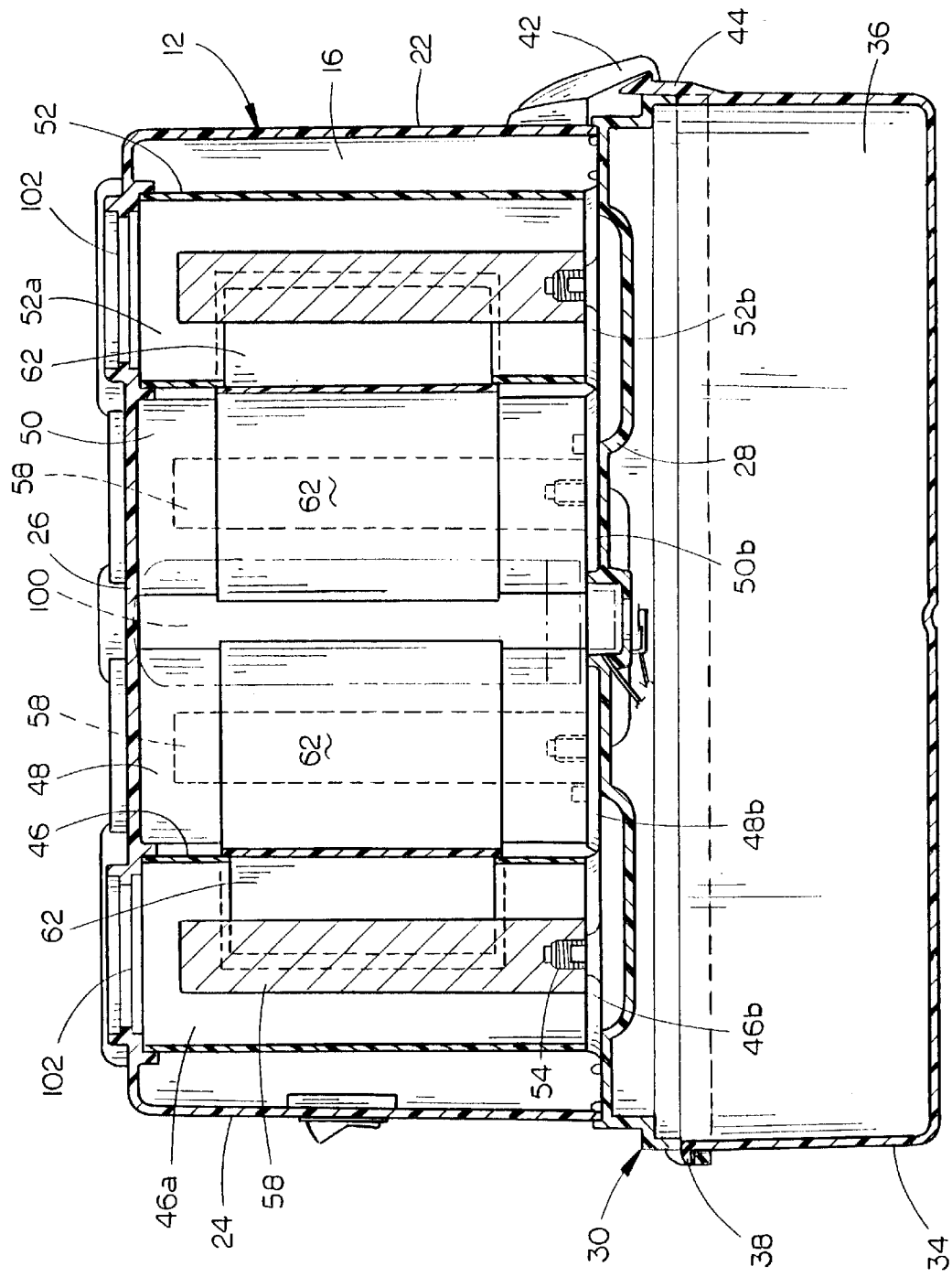
FIG. 2 is a sectional view taken at lines 2—2 in FIG. 1.

Referring now to FIG. 2, it can be seen that bottom wall 28 of housing 12 also forms the top wall of a base unit 30. Base unit 30 has a side wall 32 which projects outwardly and downwardly from the front, rear and end walls 18, 20, 22, and 24 of housing 12, to support the bottom wall 28 above the ground. A platform 34 may be connected to base unit 30 to form a storage cavity 34 under base unit 30. Platform 36 is preferably connected with a pair of hook members 38 at one end thereof journaled through receiving apertures 40 (shown in FIG. 4), and a clasp 42 at the opposite end to grip a separate hook member 44 on the platform.

As shown in FIG. 2, four cylindrical hollow tubes 46, 48, 50 and 52 extend between the top and bottom walls 26 and 28 of housing 12, to form sealed cavities 46a, 48a, 50a and 52a respectively. Each tube 46, 48, 50 and 52 is preferably mounted on a circular disk-shaped platform 46b, 48b, 50b and 52b respectively on bottom wall 28.

Figure 3:
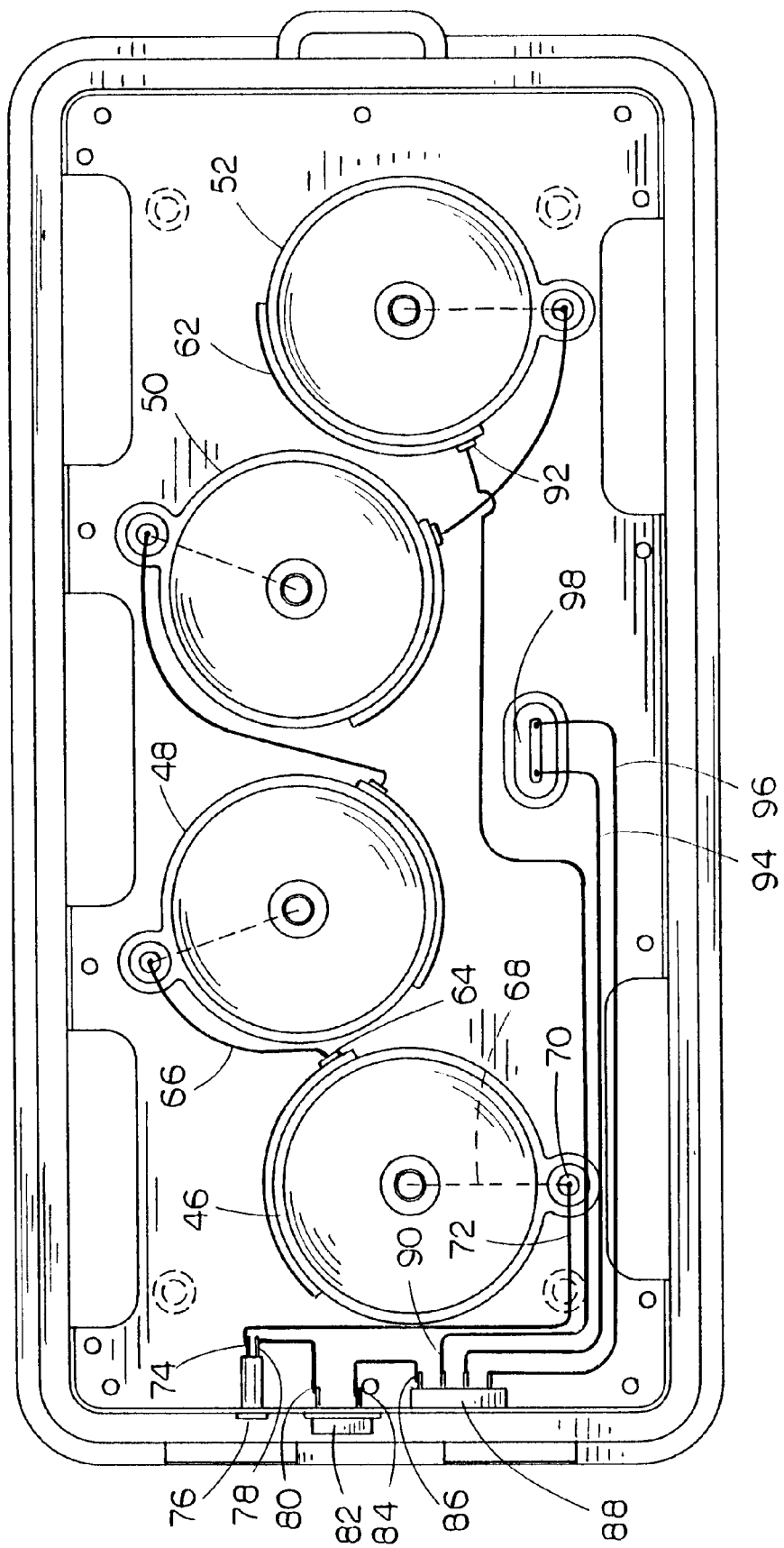
FIG. 3 is a sectional view taken at lines 3—3 in FIG. 1.
Figure 4:
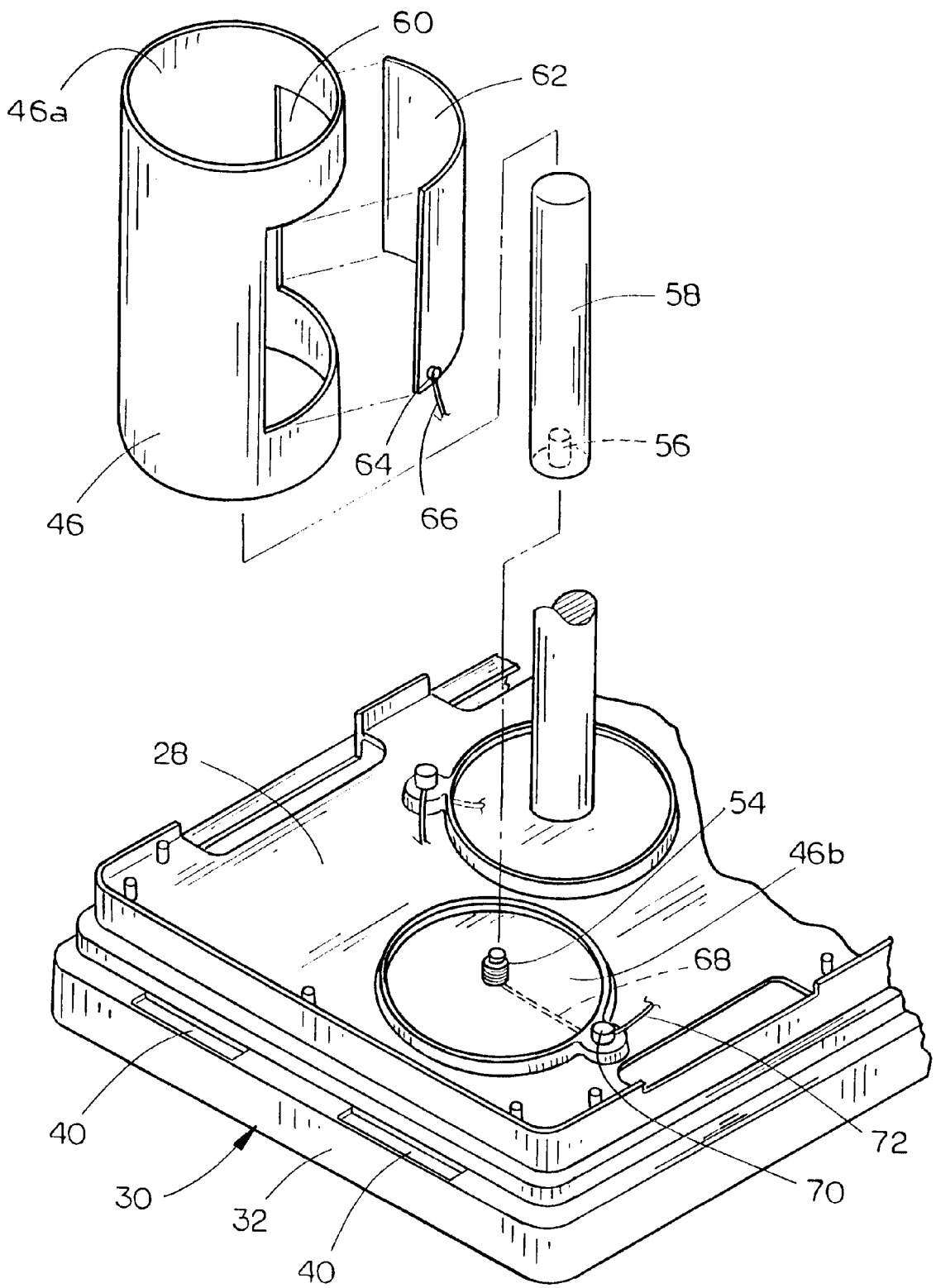
FIG. 4 is a partial exploded perspective sectional view showing the interior of the apparatus.

Referring now to FIG. 4, tube 46 is shown in more detail. A threaded metal stud projects upwardly through platform 46b and is connected to a threaded aperture 56 in the lower end of a magnesium alloy rod 58. Thus, rod 58 will extend upwardly centrally within cavity 46a of tube 46. Tube 46 has a generally rectangular opening or window 60 formed therein which is covered by an arcuate plate 62 to seal the tube 46. Plate 62 is curved to the same radius as tube 46, so that the surface of plate 62 is spaced a constant distance from rod 58. A terminal 64 is mounted on plate 62, and has a wire 66 electrically connected thereto. Similarly, stud 54 has a wire 68 connected to a lower end of the stud and extending to a terminal 70 adjacent platform 46b. A wire 72 connected to terminal 70 extends to one terminal 74 of an electrical jack 76, as shown in FIG. 3. Plate 62 is formed of an electrically conductive material and acts as a cathode when salt water is poured within cavity 46a of tube 46. Rod 58 acts as an anode and is formed of a magnesium alloy material which will react to the salt water solution so as to release electrons, which flow to plate 62 to form an electric current.

Referring once again to FIG. 2, each of tubes 48, 50 and 52 also include an anode rod 58, and a cathode plate 62 in the same fashion as tube 46. Thus, tubes 46, 48, 50 and 52 form power cells for producing an electrical current when salt water is introduced within each of the tubes.

Referring now to FIG. 3, an electrical diagram is shown wherein the power cells formed by tubes 46, 48, 50 and 52 are electrically connected in series. As described above, one wire 72 from terminal 70 is connected to one terminal 74 of an electrical jack 76. A second terminal 78 on jack 76 is electrically connected to one terminal 80 on an on/off switch 82. A second terminal 84 on on/off switch 82 is electrically connected to a terminal 86 on an electrical starter board 88. A second terminal 90 on starter board 88 is then electrically connected to a terminal 92 on the cathode plate 62 of power cell tube 52, to thereby complete the circuit. In this way, operation of on/off switch 82 will close the electrical circuit of power cells 46, 48, 50 and 52 in series with jack 76 and starter board 88. Starter board 88 preferably includes a pair of leads 94 and 96 which are connected to a socket 98 for an electrical lamp 100 (shown in FIGS. 1 and 2). Starter board 88 may be utilized to start a fluorescent lamp fixture, or other electrical device, and may be eliminated if it is merely desired to directly connect the power source to socket 98. Similarly, jack 76 permits distribution of electrical power from power cells 46, 48, 50 and 52 to other electrical apparatus through conventional plug inserted within jack 76.

Referring once again to FIG. 2, it can be seen that each of power cell tubes 46, 48, 50 and 52 have an opening 102 formed in their upper ends, permitting the introduction of salt water into the cavities 46a, 48a, 50a and 52a. A set of removable caps 104, as shown in FIG. 1, are installed on each opening to seal the opening and maintain the liquid within each of the power cells.

A depression 106 is formed in the front and top walls of housing 12, within which lamp 100 is installed. A reflective plate or coating 108 may be installed within depression 106 to reflect light from lamp 100. Obviously, the location, size and orientation of the depression 106 and lamp 100 may be altered without departing from the spirit of the invention.

In the preferred embodiment of the invention, the magnesium alloy rods are approximately 2 ½ inches long and ⅝ inch in diameter. Each cathode plate is approximately 1 inch by 1 ½ inches and 1/16 inch thick. When the power cells are provided with a salt water solution, approximately 4.8 volts are provided in a no load condition, and 4 volts in a loaded condition, and produce 500–800 milliamperes of electricity. The typical life of the unit is 30 hours at 500 milliamps. The salt water solution must then be replaced. Each of the anodes should be replaced approximately every 60 hours, and the anode and cathode are preferably scrubbed clean between refills of salt water solution in the power cells.

Whereas the invention has been shown and described in connection with the preferred embodiment thereof, many modifications, substitutions and additions may be made which are within the intended broad scope of the appended claims.

I claim:

1. A lantern powered by salt water, comprising:
   a housing having front and rear walls, top and bottom walls, and opposing end walls, forming an enclosed housing with an interior cavity;
   an enclosed hollow tube within the housing cavity, having upper and lower ends and a cylindrical, tubular side wall extending between the ends;
   said tube having an anode rod projecting within the tube spaced from the side wall;
   said rod formed of a material reactive to salt water to release a flow of electrons when in contact with salt water;
   said tube having a cathode plate formed along a portion of the side wall and formed of an electrically conductive material;
   said tube filled with a solution of at least salt and water in an amount sufficient to contact both the anode and cathode;
   an electrical lamp mounted on the housing and having first and second electrical terminals; and
   first and second electrical conductors connecting the anode and cathode to the first and second terminals on the lamp.

2. The lantern of claim 1, further comprising an operable switch interposed in the first conductor, for selectively connecting and disconnecting the anode and the lamp first terminal.

3. The lantern of claim 2, wherein said tube is generally cylindrical and wherein the anode rod is generally coaxial with a longitudinal axis of the tube.

4. The lantern of claim 3, wherein said tube side wall has an opening formed therein, and wherein said cathode plate is mounted on the tube side wall to completely cover the opening and form a liquid seal around the opening.

5. The lantern of claim 4, wherein said rod is formed of a magnesium alloy.

6. The lantern of claim 5, wherein the rod is at least 95% magnesium by volume.

7. The lantern of claim 6, wherein said tube extends vertically between the housing top and bottom walls, and further comprising:
   an opening formed in the housing top wall located at an upper end of the tube to access the interior of the tube; and
   a cap removably mounted in the top wall opening, selectively sealing the top wall opening.

8. The lantern of claim 1, wherein said tube is generally cylindrical and wherein the anode rod is generally coaxial with a longitudinal axis of the tube.

9. The lantern of claim 8, wherein said tube side wall has an opening formed therein, and wherein said cathode plate is mounted on the tube side wall to completely cover the opening and form a liquid seal around the opening.

10. The lantern of claim 9, wherein said rod is formed of a magnesium alloy.

11. The lantern of claim 10, wherein the rod is at least 95% magnesium by volume.

12. The lantern of claim 11, wherein said tube extends vertically between the housing top and bottom walls, and further comprising:
    an opening formed in the housing top wall located at an upper end of the tube to access the interior of the tube; and
    a cap removably mounted in the top wall opening, selectively sealing the top wall opening.

13. The lantern of claim 1, wherein said tube side wall has an opening formed therein, and wherein said cathode plate is mounted on the tube side wall to completely cover the opening and form a liquid seal around the opening.

14. The lantern of claim 1, wherein said rod is formed of a magnesium alloy.

15. The lantern of claim 14, wherein the rod is at least 95% magnesium by volume.

16. The lantern of claim 1, wherein said tube extends vertically between the housing top and bottom walls, and further comprising:
    an opening formed in the housing top wall located at an upper end of the tube to access the interior of the tube; and
    a cap removably mounted in the top wall opening, selectively sealing the top wall opening.

17. Apparatus for providing electrical power from salt water, comprising:
    a housing having front and rear walls, top and bottom walls, and opposing end walls forming an enclosed housing with an interior cavity;
    an enclosed hollow cylindrical tube within the housing interior cavity, having upper and lower ends and a tubular side wall extending between the ends;

said tube having an anode rod projecting within the tube spaced from the side wall;

said rod formed of a material reactive to salt water to release a flow of electrons when in contact with salt water;

said tube having a cathode plate formed along a portion of the side wall, said plate formed of an electrically conductive material;

said tube filled with a solution of at least salt and water in an amount sufficient to contact both the anode and cathode;

an electrical jack mounted on the housing and connected to the anode and cathode, for providing electric current to a plug inserted within the jack.

* * * * *